US012575558B2

(12) United States Patent
Romot et al.

(10) Patent No.: US 12,575,558 B2
(45) Date of Patent: Mar. 17, 2026

(54) PACKAGING SYSTEM FOR A MEDICAL PRODUCT

(71) Applicant: Axogen Corporation, Alachua, FL (US)

(72) Inventors: Brian Romot, Alachua, FL (US);
Justin Deuerling, Alachua, FL (US);
Cristina Slade, Alachua, FL (US);
Shashank Kabra, Alachua, FL (US);
Jane Severin, Warsaw, IN (US)

(73) Assignee: Axogen Corporation, Alachua, FL (US)

( * ) Notice: Subject to any disclaimer, the term of this patent is extended or adjusted under 35 U.S.C. 154(b) by 873 days.

(21) Appl. No.: 17/504,694

(22) Filed: Oct. 19, 2021

(65) Prior Publication Data

US 2022/0142150 A1 May 12, 2022

Related U.S. Application Data

(60) Provisional application No. 63/111,901, filed on Nov. 10, 2020.

(51) Int. Cl.
*A01N 1/142* (2025.01)
*A01N 1/122* (2025.01)
(52) U.S. Cl.
CPC ............. *A01N 1/142* (2025.01); *A01N 1/122* (2025.01)
(58) Field of Classification Search
CPC ................................ A01N 1/122; A01N 1/142
See application file for complete search history.

(56) References Cited

U.S. PATENT DOCUMENTS

| | | | |
|---|---|---|---|
| 4,838,288 | A | 6/1989 | Wright et al. |
| 5,964,096 | A | 10/1999 | Watson et al. |
| 6,533,817 | B1 | 3/2003 | Norton et al. |
| 10,806,558 | B1 | 10/2020 | Perry |
| 2002/0029981 | A1 | 3/2002 | Nigam |
| 2003/0168370 | A1* | 9/2003 | Merboth ............... A61F 2/0095 |
| | | | 206/438 |

(Continued)

FOREIGN PATENT DOCUMENTS

| | | |
|---|---|---|
| CN | 101569559 A | 11/2009 |
| CN | 102036555 A | 4/2011 |

(Continued)

OTHER PUBLICATIONS

Handbook of Plastics Joining, 2008, William Andrew, Second edition, front matter and Chapter 18, pp. 175-201 (Year: 2008).*

(Continued)

*Primary Examiner* — Matthew D Krcha
*Assistant Examiner* — Jonathan E Lepage
(74) *Attorney, Agent, or Firm* — Bookoff McAndrews, PLLC

(57) ABSTRACT

A packaging system includes a holder and an inner container. The holder includes a top portion and a bottom portion that cooperate to form a cavity configured to receive one or more medical products therein and to retain the one or more medical products therein. The inner container defines an interior region configured to receive the holder therein. The holder includes sidewalls that form the cavity, and the sidewalls include channels configured to fluidly connect the cavity to the interior region of the inner container.

10 Claims, 10 Drawing Sheets

(56) References Cited

U.S. PATENT DOCUMENTS

| | | | |
|---|---|---|---|
| 2013/0277261 A1 | 10/2013 | Kinyon | |
| 2013/0325111 A1 | 12/2013 | Campbell et al. | |
| 2014/0017657 A1 | 1/2014 | Kravitz et al. | |
| 2015/0048085 A1* | 2/2015 | Brown | A61J 1/16 |
| | | | 220/228 |
| 2017/0164606 A1 | 6/2017 | Suzuki et al. | |
| 2018/0193127 A1 | 7/2018 | Poyss et al. | |
| 2020/0390087 A1 | 12/2020 | Sadik | |
| 2020/0390088 A1 | 12/2020 | Sadik | |

FOREIGN PATENT DOCUMENTS

| | | |
|---|---|---|
| CN | 104619168 A | 5/2015 |
| CN | 104619169 A | 5/2015 |
| CN | 110432260 A | 5/2015 |
| CN | 106508890 A | 3/2017 |
| CN | 206303084 U | 7/2017 |
| CN | 110402081 A | 11/2019 |
| JP | 2004526467 A | 9/2004 |
| JP | 2007269327 A | 10/2007 |
| JP | 2014079170 A | 5/2014 |
| JP | 2014100111 A | 6/2014 |
| WO | 00/54584 A1 | 9/2000 |
| WO | 01/93784 A2 | 12/2001 |
| WO | 03076300 A1 | 9/2003 |
| WO | 2013184552 A1 | 12/2013 |
| WO | WO-2015095651 A1 * | 6/2015 ............. A01N 1/122 |
| WO | WO-2015172159 A1 * | 11/2015 .............. A01N 1/02 |
| WO | WO-2018208576 A1 * | 11/2018 ........... A01N 1/0268 |

OTHER PUBLICATIONS

International Search Report and Written Opinion issued in International Application No. PCT/US2021/055711, issued Apr. 5, 2022 (22 pages).
International Search Report and Written Opinion issued in International Application No. PCT/US2021/055713, issued Apr. 11, 2022 (20 pages).
Packaging World: "Artegraft switches to copolyester for vascular graft tubes", Jan. 10, 2008, pp. 1-3, XP055886433.

* cited by examiner

PACKAGING SYSTEM FOR A MEDICAL PRODUCT

CROSS-REFERENCE TO RELATED APPLICATIONS

This patent application claims the benefit under 35 U.S.C. § 120 to U.S. Provisional Patent Application No. 63/111,901, filed on Nov. 10, 2020, the entirety of which is incorporated herein by reference.

TECHNICAL FIELD

The present disclosure generally relates to packaging systems for a medical product, and, more particularly, to packaging systems for storing a medical product in a fluid, including to packaging systems for room-temperature storage of a tissue product in a fluid.

BACKGROUND

Biological tissues may provide improved functional performance as compared to equivalent synthetic devices when used in in vivo implantation. However, the availability and usage of tissue grafts may be restricted by supply constraints and logistical concerns of transporting and/or storing the tissue grafts. Various techniques have been developed that allow for the transportation and storage of tissues that may be suitable for use in surgical implantation. However, many of the developed techniques may require the use of specialized refrigeration or freezer equipment for storing the donor tissue at extremely low temperatures. Such requirements may restrict the facilities that are able to use the available tissues, and/or may complicate the transportation of tissue to end-use surgical facilities. Further, other techniques comprise preparation and storage of dried tissue. Whether dried or stored at low temperatures, such tissue products can require inconvenient and time-consuming pre-operative preparations to make them appropriate for surgical use. Moreover, various known storage systems may be limited in that they require a particular orientation of the storage system in order to cover the tissue in a storage fluid, in order to maintain a fluid seal, in order to prevent fluid loss, etc.

The packaging systems and related methods described herein may help to overcome some of these issues and/or may help to improve the transport, storage, pre-operative preparation, and ultimate use of wet-preserved tissue. For example, in some suitable storage approaches, the tissue may be stored in a preservative solution that may prolong the useful storage life of the tissue. In some such storage approaches, the tissue may be retained in the preservation solution until the tissue is used in a medical procedure. Further, the packaging systems and related methods described herein may be used in the room temperature storage of tissue products.

SUMMARY

According to an implementation, a packaging system may include a holder and an inner container. The holder may include a top portion and a bottom portion that cooperate to form a cavity configured to receive one or more medical products therein and to retain the one or more medical products therein. The inner container may define an interior region configured to receive the holder therein. The holder may include sidewalls that form the cavity, and the sidewalls may include channels configured to fluidly connect the cavity to the interior region of the inner container.

The packaging system may include one or more of the following features. The inner container may include an inner tray that includes a first portion and a second portion, and the first portion and the second portion may each include an interlocking portion that forms a seal when coupled together. The packaging system may further include an outer container, and the outer container may include a well configured to receive the inner container therein. The channels may be formed by extensions and indentations in the sidewalls. The extensions and indentations in the sidewalls may be rounded. At least one of the holder, the inner container, or the outer container may be formed of a plastic material and/or via thermoforming.

The inner container may be a vial. The vial may include one or more retention features that project inward into the vial and are dimensioned to constrain movement of the holder when received within the vial. The vial may include one or more surface features configured to inhibit rolling of the vial when placed on a surface. The packaging system may further include a fluid configured to preserve one or more medical products within the cavity of the holder.

In another implementation, a method of packaging one or more medical products may include inserting a medical product within a cavity of a holder; closing the holder to enclose the medical product; inserting the holder and the medical product into one portion of an inner container; delivering a liquid into the one portion of the inner container; coupling another portion of the inner container to the one portion of the inner container to enclose the holder and the medical product within the inner container; inserting the inner container, the holder, and the medical product into an outer container; and covering a portion of the outer container with a sealing material.

The method of packaging one or more medical products may include one or more of the following features. Closing the holder may include coupling a coupling portion on a bottom portion of the holder to a coupling portion on a top portion of the holder to enclose the medical product within the cavity of the holder. Covering the portion of the outer container with the sealing material may include forming a Tyvek seal over the outer container. The medical product may include one or more of a nerve tissue, a vein graft, a vascular tissue, an urological tissue, a tendon, or a muscle tissue. The liquid may include a solution including about 2% to about 15% by volume dimethyl sulfoxide (DMSO), and one or more monovalent and/or divalent metal cations.

In another implementation, a method of storing one or more medical products may include packaging the one or more medical products according to the method of packaging one or more medical products; and also storing the one or more packaged medical products. The may further include exposing the one or more packaged medical products to a temperature of approximately −85 degrees Celsius. Storing the one or more packaged medical products may include exposing the one or more medical products to a temperature of about 15 degrees Celsius to about 30 degrees Celsius.

In yet another implementation, a holder for one or more medical products may include a top portion and a bottom portion pivotably connected to the top portion via a joint. The top and bottom portions may cooperate to form a cavity configured to hold one or more medical products therein. The cavity may be fluidly connected to an exterior of the holder. One or both of the top portion or the bottom portion may include sidewalls that form the cavity. The sidewalls may include a plurality of channels to fluidly connect the cavity to the exterior of the holder. The channels through the sidewalls may be formed by rounded extensions and indentations in the sidewalls.

The holder may include one or more of the following features. The top portion and the bottom portion each may include a coupling portion configured to secure the holder in a closed configuration when mated together. The coupling portion of the top portion may include either a hole or a peg, and the coupling portion of the bottom portion may include either the peg or the hole configured to mate with the peg or the hole of the top portion. The top portion and the bottom portion may be formed of plastic and shaped via thermoforming.

A packaging system may include the holder for one or more medical products and a vial. The vial may include one or more retention features that project inward into the vial and are dimensioned to constrain movement of the holder when received within the vial. The vial may include one or more surface features configured to inhibit rolling of the vial when placed on a surface. The packaging system may further include a fluid configured to preserve one or more medical products contained within the cavity of the holder. The vial may be at least partially transparent and may be formed of one or more of polypropylene, high density polyethylene, polymethylpentene, polyethylene terephthalate glycol-modified, or fluorinated ethylene propylene. The vial may be configured to withstand temperatures ranging from about −85 degrees Celsius to about 50 degrees Celsius.

One of ordinary skill in the art will appreciate that the packaging systems, the medical products, and the methods of storing the medical products in the packaging systems disclosed herein may be used in the surgical interventions of humans and other vertebrates, as well is in laboratory studies, comparisons, and assays, including in vitro analyses.

One of ordinary skill in the art will also appreciate that materials, sizes, shapes, etc. of the packaging systems, solutions (i.e., preservation solutions, rinsing solutions, etc.), and/or methods of storing or removing the medical products other than those specifically exemplified can be employed in the practice of the disclosure without resort to undue experimentation. All art-known functional equivalents of any such materials and methods are intended to be included in this disclosure.

Other objects, features and advantages of the present disclosure will become apparent from the following detailed description. It should be understood, however, that the detailed description and the examples, while indicating exemplary embodiments of the present disclosure, are given by way of illustration only, since various changes and modifications within the spirit and scope of the invention will become apparent to those skilled in the art from this detailed description. Note that simply because a particular compound is ascribed to one generic formula does not mean that it cannot also belong to another generic formula.

The singular forms "a," "an," and "the" include plural reference unless the context dictates otherwise. The terms "approximately" and "about" refer to being nearly the same as a referenced number or value. As used herein, the terms "approximately" and "about" generally should be understood to encompass ±5% of a specified amount or value. The use of the term "or" in the claims is used to mean "and/or" unless explicitly indicated to refer to alternatives only or the alternatives are mutually exclusive, although the disclosure supports a definition that refers to only alternatives and "and/or." As used herein, "another" may mean at least a second or more. As used herein, "adjacent" and "proximate" are used to mean that components are in abutting contact, or are separated but in a near or neighboring arrangement. Moreover, it is noted that the terms "top" and "bottom" are terms that refer to the orientations shown in the figures. Nevertheless, these terms are relative terms, and the relative positions or orientations of various components discussed herein may vary depending on the viewpoint toward the components, the arrangement of the components relative to gravity, etc.

The terms and expressions which have been employed are used as terms of description and not of limitation, and there is no intention that in the use of such terms and expressions of excluding any equivalents of the features shown and described or portions thereof, but it is recognized that various modifications are possible within the scope of the disclosure claimed.

DETAILED DESCRIPTION OF EXAMPLE EMBODIMENTS

In general, various embodiments of the present disclosure may relate to packaging systems. In some implementations, the packaging systems may be utilized for packaging one or more medical products, for example, one or more tissue specimens, nerve grafts (e.g., an Avance® Nerve Graft by Axogen), etc., which may be intended for use in connection with surgical procedures. In some examples, the packaging systems may allow the medical product(s) to be packaged in a liquid, e.g., which may facilitate storage and/or preservation of the medical product(s), including at room temperature (e.g., ranging from about 15 degrees Celsius to about 30 degrees Celsius). In some embodiments, the liquid may include a preservation liquid and/or solution. Further, in some example embodiments, packaging systems consistent with the present disclosure may include features that facilitate manipulation of the medical product(s) contained therein, for example, removal of the medical product(s) from the packaging and/or during other operations. Additionally, packaging systems consistent with the present disclosure may include one or more materials and/or configurations that may allow the medical product(s) to be packaged in one or more packaging elements, e.g., which may facilitate storage and/or preservation of the medical products(s), including at room temperature (e.g., ranging from about 15 degrees Celsius to about 30 degrees Celsius). In some aspects, packaging systems consistent with the present disclosure may allow the medical product(s) to be packaged and stored in the liquid. The medical product(s) may be contained in one or more packaging elements formed of the one or more materials and/or in the one or more configurations, which may facilitate storage and/or preservation of the medical product(s), including while exposed to colder and warmer temperatures than room temperature (e.g., ranging from about −85 degrees Celsius to about 50 degrees Celsius) and/or at the temperature range appropriate for the material medical product being stored.

Figure 1:
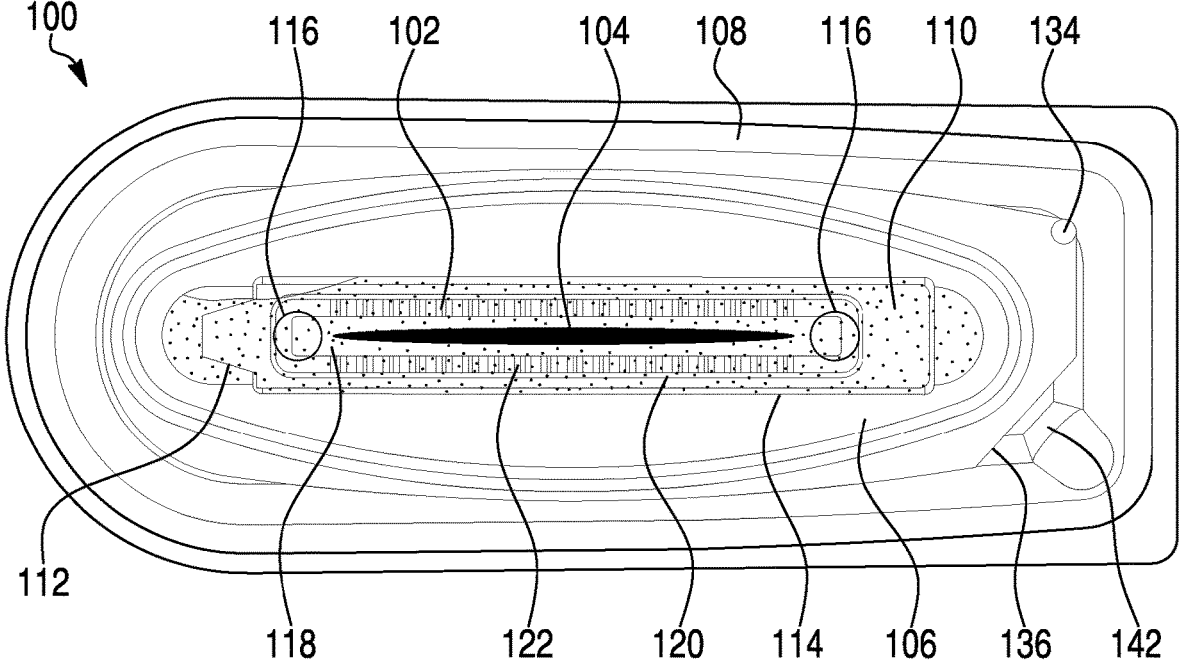
FIG. 1 illustrates an exemplary packaging system in a partially-assembled configuration, according to aspects of the present disclosure.
Figure 2:
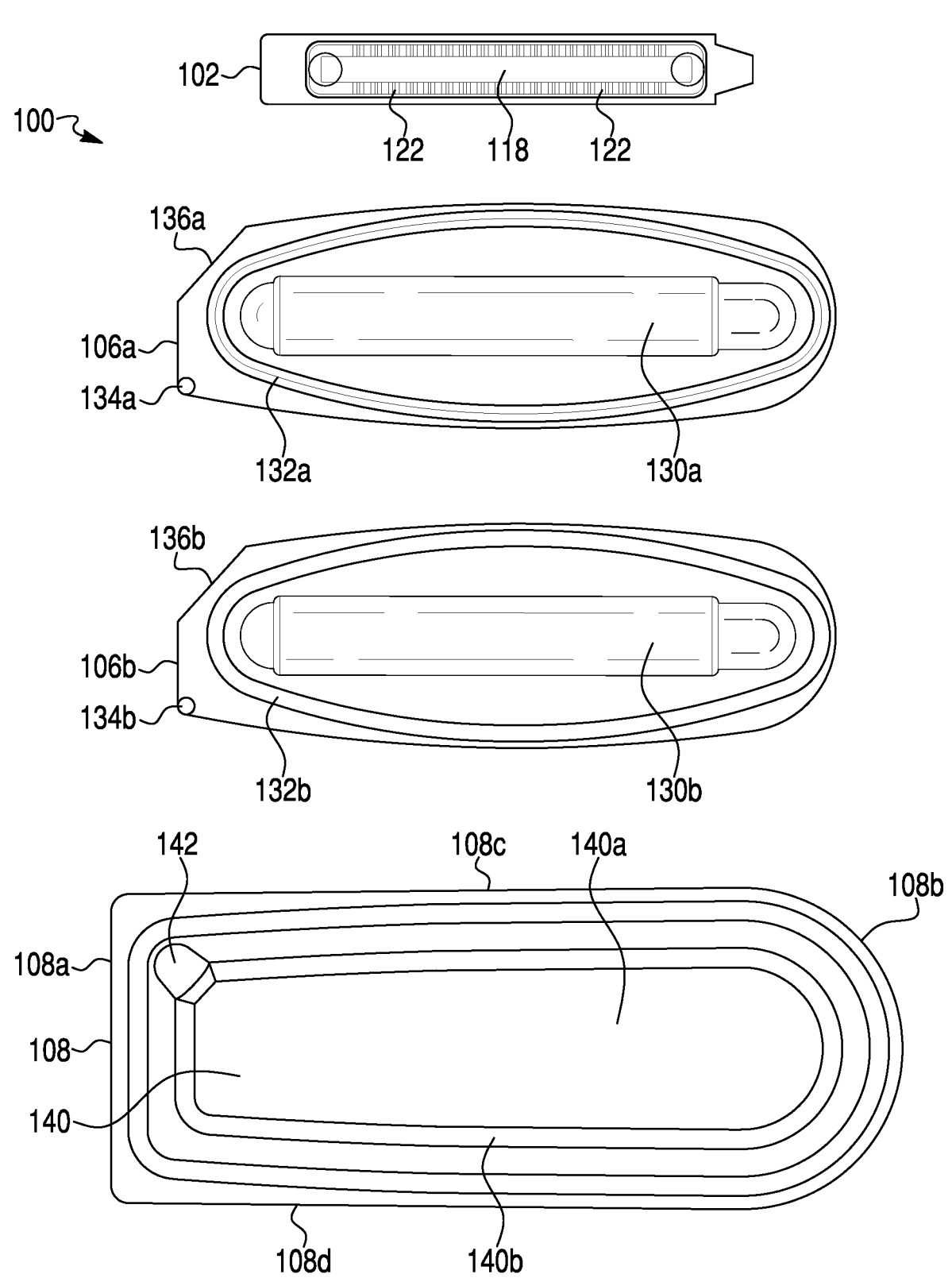
FIG. 2 illustrates the packaging system of FIG. 1 in an unassembled configuration, according to aspects of the present disclosure.

FIG. 1 illustrates a packaging system 100 in a partially assembled configuration, and FIG. 2 illustrates packaging system 100 in an unassembled configuration. Packaging system 100 includes a holder 102. Holder 102 may hold, enclose, or otherwise support one or more medical products 104. Packaging system 100 may also include an inner container, for example, an inner tray 106, and an outer container, for example, an outer tray 108. Inner tray 106 and outer tray 108 may at least partially surround holder 102, for example, in order to enclose or contain a fluid 110, e.g., a preservation liquid, therein, and/or to provide a sterile barrier. As shown in FIG. 1, when packaging system 100 is assembled, fluid 110 may surround medical product 104. In some aspects, fluid 110 may help to preserve medical product 104, for example, at room temperature. Although not shown, a removable sealing material may be deposited over at least a portion of outer tray 108 to form a barrier or coating over outer tray 108, including to protect the sterility of the components sealed therein.

It is noted that while reference is made to packaging system 100 enclosing medical product 104, packaging system 100 may be used for any product that is intended to be partially or completely submerged, coated, or otherwise surrounded by a fluid. Moreover, while reference is made to fluid 110, it is noted that fluid 110 may be one or more liquids that may facilitate the storage and/or preservation of medical product 104, for example, one or more tissue specimens (e.g. animal-derived, human-derived, or otherwise synthetic or grown tissue specimens), including nerve grafts (e.g., an Avance® Nerve Graft by Axogen), etc.

As shown in greater detail with respect to FIGS. 3A-3E, holder 102 may include a general clamshell design, for example, with a top portion 102a and a bottom portion 102b pivotably coupled by a joint 112. In some aspects, joint 112 may be formed by a coined hinge. For example, joint 112 may include a narrower or smaller width and/or thickness of material than the adjacent portions of holder 102. In some aspects, joint 112 may include a more condensed material than the adjacent portions of holder 102. In these aspects, joint 112 may help to maintain an orientation of holder 102, for example, in the closed configuration and/or in one or more open, partially open, full open, etc., configurations between top portion 102a and bottom portion 102b. This may allow a user to open holder 102 so that when the user releases holder 102, or a portion thereof, top portion 102a and bottom portion 102b substantially maintain their positions relative to one another. For example, the user may open holder 102 and lay the opened holder 102 relatively flat so that top portion 102a and bottom portion 102b are oriented approximately 180 degrees from one another. When the user releases holder 102, or a portion thereof, holder 102 may substantially maintain this orientation. In another example, a user may open holder 102 and fold holder 102 back on itself so that top portion 102a and bottom portion 102b are touching each other. When the user releases holder 102, or a portion thereof, holder 102 may maintain this orientation. In some embodiments including a coined hinge joint 112, the ability of top portion 102a and bottom portion 102b to maintain their relative orientations once a user has released holder 102, or a portion thereof, may make it easier for the user to remove the medical product(s) 104 from holder 102.

Holder 102 may be substantially rectangular, and may include a free end 114, for example, opposite to joint 112. Nevertheless, although not shown, holder 102 may be substantially circular, elliptical, triangular, pentagonal, or another suitable shape, which may or may not correspond to medical product(s) 104. Holder 102 may include one or more coupling portions 116, for example, on one or more of joint 112 or free end 114. Coupling portions 116 may include mating projection and recess (e.g., peg/hole) arrangements to form a friction fit, a press fit, a snap fit, etc. in order to form a releasable securing mechanism, as discussed in detail below with respect to FIGS. 3A-3E. Although the portions of holder 102 are referred to as top and bottom portions herein, it is noted that these terms are relative and, when assembled, either top portion 102a or bottom portion 102b may be above or below the other portion relative to gravity.

When coupled in a closed configuration, as shown in FIGS. 1 and 2, top portion 102a and bottom portion 102b may collectively define and/or cooperate to form a cavity 118, for example, to receive medical product 104. Cavity 118 as shown is generally rectangular, and may be at least partially formed by sidewalls 120. The width, length, and depth of cavity 118 may vary depending on the size, shape, or other details of medical product(s) 104 to be retained within cavity 118. Cavity 118 may be any suitable shape and may or may not correspond to the shape of medical product 104 to be contained therein. Additionally, holder 102 may include one or more channels 122, for example, inlets/outlets extending laterally through sidewalls 120 of holder 102 to fluidly connect cavity 118 to outside of holder 102, for example, to inner tray 106 when holder 102 is positioned within inner tray 106. As shown in FIGS. 3A-3E, channels 122 may be formed by extensions 124 and indentations 126 in sidewalls 120 of one or more of top portion 102a or bottom portion 120b. For example, as shown in FIG. 3C, bottom portion 102b may include channels 122, and top portion 102a may be sized to fit over a portion of channels 122. In one aspect, although not shown, extensions 124 and indentations 126 may be positioned on top portion 102a and bottom portion 102b in an at least partially offset manner, for example, such that top portion 102a and bottom portion 102b may be coupled by interlocking one extension 124 from top portion 102a in one indentation 126 in bottom portion 102b, or vice versa. For example, extension 124 may only partially be received within indentation 126, such that an opening between top portion 102a and bottom portion 102b forms one channel 122. Furthermore, in another aspect, although not shown, top portion 102a and bottom portion 102b may each include sidewalls 120 such that when coupled in a closed configuration, side walls 120 of top portion 102a and bottom portion 102b at least partially overlap but also form channels 122.

In some aspects, medical product 104 may include tissue. For example, medical product 104 may include human tissue or animal tissue or may be synthetic or grown tissue. Examples of tissues that may be used in connection with the present disclosure may include, but are not limited to, nerve tissue or grafts (e.g., an Avance® Nerve Graft by Axogen), vein grafts, vascular tissue, urological tissue, tendons, muscle tissue, etc.

Holder 102 may be positioned within inner tray 106. As shown in FIG. 2, inner tray 106 may include a first portion 106*a* and a second portion 106*b*, which may fit together, for example, via a friction fit, press-fit, or snap-fit arrangement to enclose holder 102, medical product 104, and fluid 110. First portion 106*a* may include a first pocket 130*a*, and second portion 106*b* may include a second pocket 130*b*. Pockets 130*a* and 130*b* may be, for example, semi-cylindrical indentations in first portion 106*a* and second portion 106*b*. Accordingly, when first portion 106*a* and second portion 106*b* are coupled together, pockets 130*a* and 130*b* may form a substantially cylindrical hollow cavity to contain holder 102, medical product 104, and fluid 110. First portion 106*a* and second portion 106*b*, along with pockets 130*a* and 130*b*, may be any suitable shape and may or may not correspond to the shape of holder 102 to be contained therein.

First portion 106*a* and second portion 106*b* may each include interlocking portions. For example, first portion 106*a* may include a first interlocking portion 132*a*, which may be formed by a projection extending out of a plane formed by first portion 106*a*. Second portion 106*b* may include a second interlocking portion 132*b*, which may be formed by an indentation recessed into a plane formed by second portion 106*b*. The coupling of first interlocking portion 132*a* with second interlocking portion 132*b* may help to form a seal between first portion 106*a* and second portion 106*b*, for example, that inhibits or completely prevents fluid (e.g., fluid 110) from leaking out of inner tray 106. Interlocking portions 132*a* and 132*b* may include generally elliptical shapes, which may facilitate coupling of first portion 106*a* and second portion 106*b*. The generally elliptical shapes of interlocking portions 132*a* and 132*b* may also form the seal that inhibits or completely prevents fluid 110 from leaking out of inner tray 106. For example, the elliptical shapes of the interlocking portions 132*a* and 132*b* may generate a substantially consistent radial force (e.g., a substantially evenly spread force) between interlocking portions 132*a* and 132*b* and may form a sealed pocket between first portion 106*a* and second portion 106*b*. Alternatively, interlocking portions 132*a* and 132*b* may include one or more other shapes without limitation (e.g., generally circular, generally triangular, generally rectangular, etc.), which may also help to form the seal that inhibits or completely prevents fluid 110 from leaking out of inner tray 106.

Furthermore, as shown in FIG. 1, in some embodiments, inner tray 106 may include a coupling portion 134, which may include mating projection and recess (e.g., peg/hole) arrangements. For example, as shown in FIG. 2, first portion 106*a* may include a first coupling portion 134*a*, which may include a peg or other suitable projection, and second portion 106*b* may include a second coupling portion 134*b*, which may include a hole, opening, or other suitable recessed portion. When first and second portions 134*a* and 134*b* are mated together, they may align first and second interlocking portions 132*a* and 134*b* together, and may help to secure first portion 106*a* and second portion 106*b* together. In one aspect, as shown in FIG. 2, first portion 106*a* may include a tapered side portion 136*a*, and second portion 106*b* may include a tapered side portion 136*b*. Tapered side portions 136*a* and 136*b* may be adjacent to or on the same ends of first and second portions 106*a* and 106*b* (e.g., adjacent to or on the same ends of pockets 130*a* and 130*b*) as interlocking portions 134*a* and 134*b*. Moreover, when first portion 106*a* and second portion 106*b* are coupled together to enclose holder 102, holder 102 may be at least partially fixed relative to first portion 106*a* and second portion 106*b*. For example, one or more portions of holder 102 may be partially squeezed or otherwise secured between first portion 106*a* and second portion 106*b*, such that holder 102 does not substantially move within inner tray 106, for example, during storage, transportation, pre-operative handling, etc.

Outer tray 108 may include a generally elliptical shape. In one aspect, outer tray 108 includes a flat end portion 108*a* and a rounded end portion 108*b*. Flat end portion 108*a* and rounded end portion 108*b* may be connected by side portions 108*c* and 108*d*, which may be generally straight. Outer tray 108 includes a well 140, and well 140 is configured to receive at least a portion of inner tray 106. For example, well 140 may be formed by an indented portion of outer tray 108 that extends into a plane formed by outer tray 108. Alternatively, although not shown, outer tray 108 may be any suitable shape and may or may not correspond to the shape of inner tray 106 to be contained therein.

Moreover, well 140 may include one or more stratifications or one or more portions with different depths. For example, well 140 may include a central portion 140*a*, and may include one or more edge portions 140*b*. Central portion 140*a* may be deeper than edge portions 140*b*. For example, edge portions 140*b* may be angled (e.g., 45 degrees) to transition from the edge of outer tray 108 and central portion 140*a*. In some aspects, outer tray 108 may include a tab or notched portion 142, for example, adjacent to or connected to well 140. In these aspects, inner tray 106 may be positioned within well 140, and although not shown, a sealing material (e.g., a seal formed of high-density spun-bound polyethylene fibers or a Tyvek® seal) may be deposited over well 140 to form a sterile coating or barrier over a portion of outer tray 108, which may maintain sterility of outer tray 108 and its contents.

With inner tray 106 positioned within well 140 of outer tray 108, tapered side portion 136, formed by tapered side portions 136*a* and 136*b*, may align with or be positioned adjacent to notched portion 142, as shown in FIG. 1. Notched portion 142 may be configured to help the user to manipulate (e.g., remove) the sealing material from outer tray 108 and to open outer tray 108 to expose inner tray 106 containing holder 102 and medical product(s) 104. Additionally, notched portion 142 may help the user to manipulate inner tray 106 (e.g., remove one of first portion 106*a* or second portion 106*b*) to access holder 102 and medical product(s) 104. In one aspect, notched portion 142 may help the user grip the sterile coating or barrier that is formed over outer tray 108, for example, to remove the sterile coating or barrier to access the contents of outer tray 108.

Referring back to well 140, well 140 may also help to retain any fluid 110 that may leak out from inner tray 106, for example, during storage, transportation, pre-operative handling, etc. Well 140 may also be configures to retain any fluid 110 that may leak from inner tray 106 during the manipulation of the packaging during use, for example, as the user opens packaging system 100 to remove or otherwise access medical product(s) 104. In one aspect, well 140 may include a flattened portion, which may form a generally flat bottom for outer tray 108. The flattened portion may facilitate stacking or packaging a plurality of packaging systems 100 during storage or shipping. Moreover, a generally flat bottom portion of outer tray 108 may facilitate placement of packaging system 100 during opening and/or use of medical product(s) 104, for example, when outer tray 108 is positioned on a flat surface before, during, or after a medical procedure. It is noted that the sizes of one or more of holder 102, inner tray 106, or outer tray 108 may be any appropriate size and/or thickness. For example, as discussed above, the size and/or shape of holder 102 may or may not correspond to the size and/or shape of medical product(s) 104. Additionally, the size and/or shape of inner tray 106 may or may not correspond to the size and/or shape of holder 102, and the size and/or shape of outer tray 108 may or may not correspond to the size and/or shape of inner tray 106.

Figures 3A, 3B:
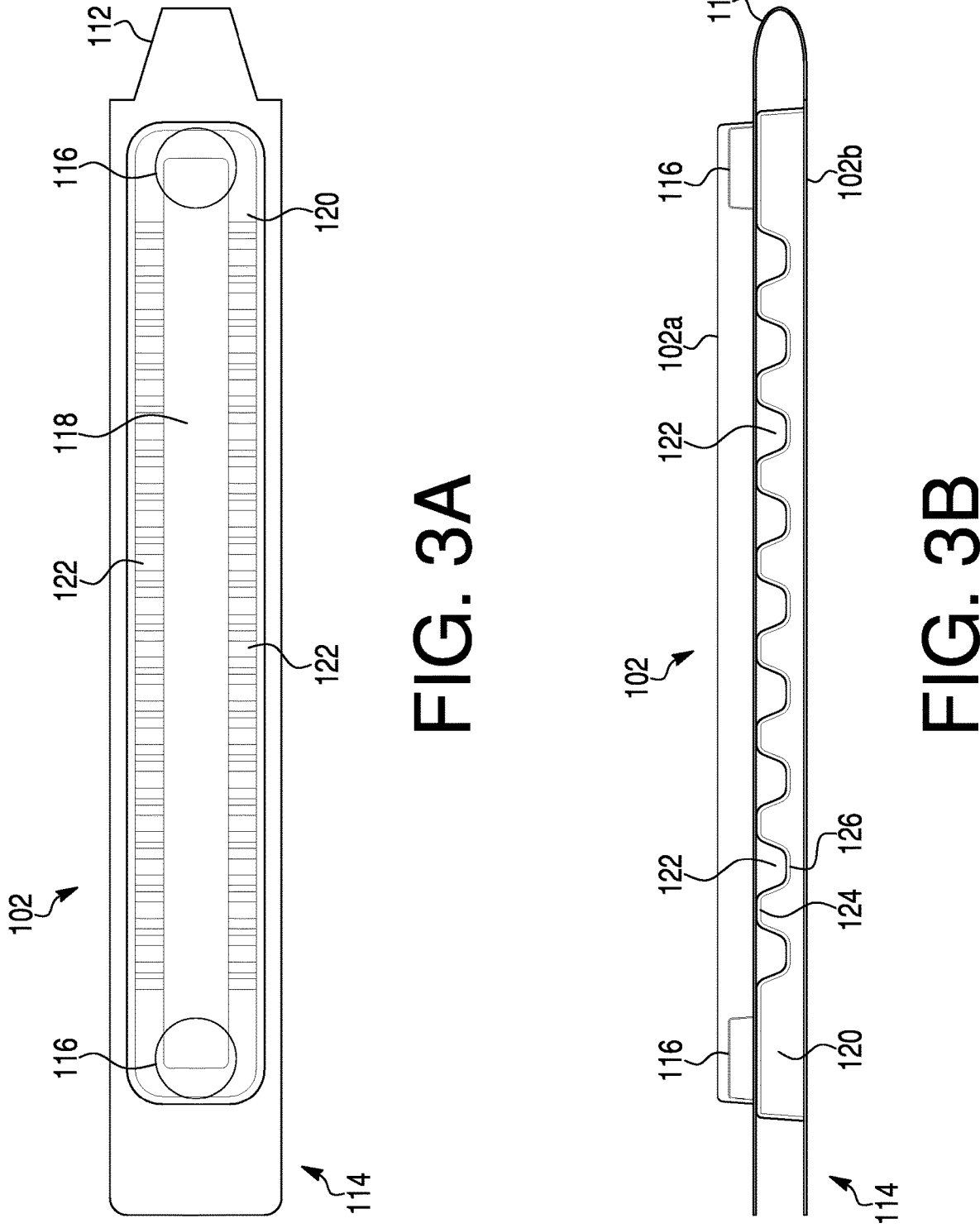
FIGS. 3A-3E illustrate various views of a portion of the packaging system of FIG. 1, according to aspects of the present disclosure.
Figure 3C:
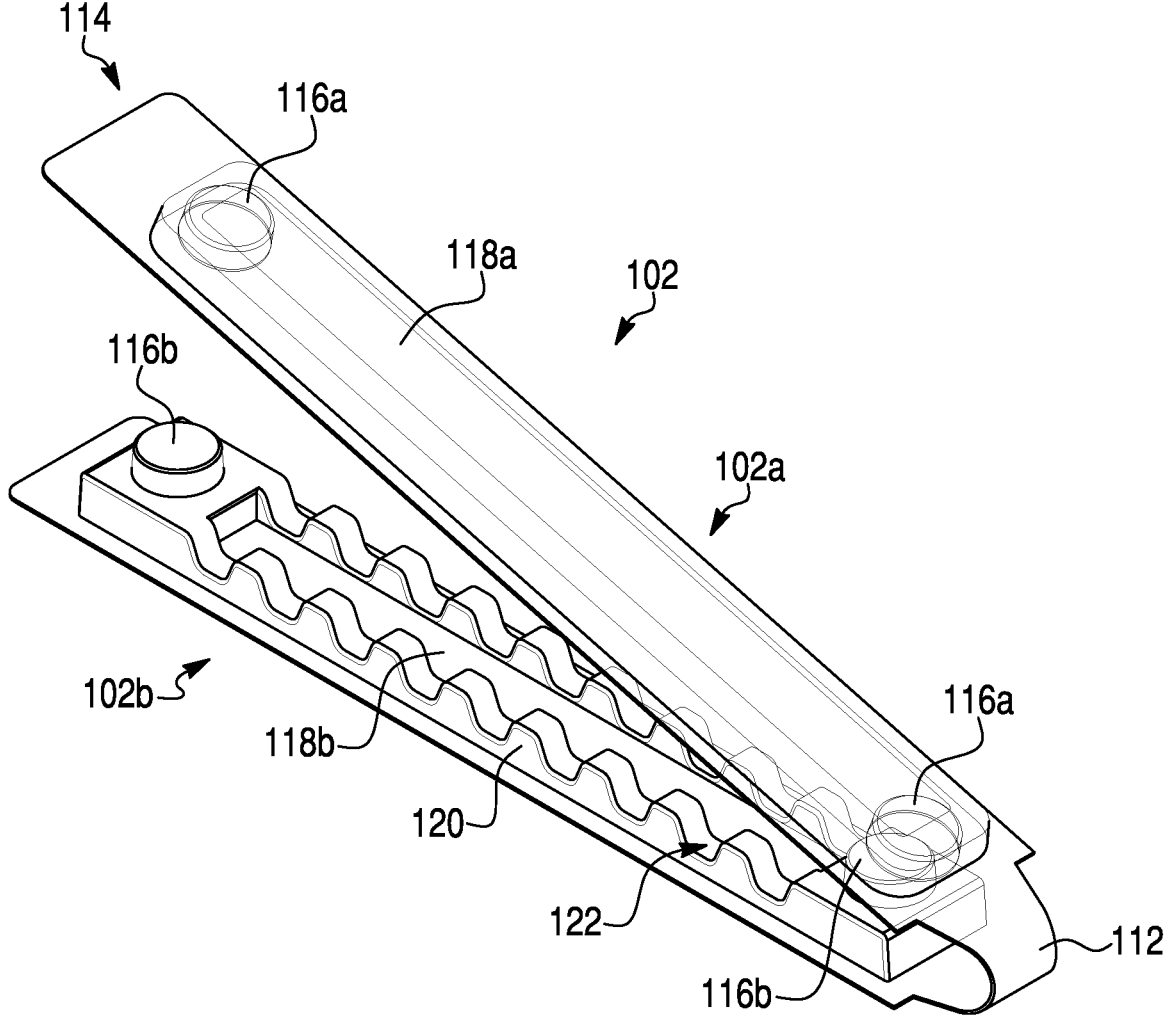

FIGS. 3A-3E depict various views of holder 102. As mentioned previously, holder 102 includes top portion 102a and bottom portion 102b, which may be connected by joint 112. Holder 102 may also include coupling end 114. One or more of joint 112 and coupling end 114 may include one or more coupling portions 116. For example, FIG. 3A is a top view of holder 102, and FIG. 3B is a side view of holder 102. In the embodiments in which top portion 102a and bottom portion 102b are coupled by joint 112, coupling end 114 may be formed by ends of top portion 102a and bottom portion 102b that are opposite to joint 112. Accordingly, the ends of top portion 102a and bottom portion 102b that form coupling end 114 are moveable relative to each other, for example, via movement of top portion 102a and bottom portion 102b via joint 112. In another aspect, top portion 102a and bottom portion 102b may be separate portions, for example, not coupled by joint 112. In this aspect, top portion 102a and bottom portion 102b may be separable and couplable, for example, via one or more coupling portions 116.

As shown in FIG. 3A, holder 102 includes cavity 118 configured to receive medical product(s) 104 (not shown), and cavity 118 may be formed by sidewalls 120 in one or both of top portion 102a or bottom portion 102b. Sidewalls 120 include a plurality of channels 122, as discussed above. As shown in FIG. 3B, channels 122 may be formed by a plurality of extensions 124 and indentations 126 in sidewall 120, for example, in bottom portion 102b. With top portion 102a secured to bottom portion 102b, channels 122 are open to allow for fluid 110 (not shown) to flow between cavity 118 and the pocket formed by inner tray 106 when holder 102 is positioned within inner tray 106. Nevertheless, extensions 124 and cavity 118 may be configured to retain medical product(s) 104 in an orientation (i.e., a linear orientation extending along a length of holder 102). Additionally, extensions 124 and indentations 126 may be rounded or include gradual changes in shape, which may help prevent damage to medical product(s) 104 during insertion of medical product(s) 104 into cavity 118, during removal of medical product(s) 104 from cavity 118, and/or during storage, transportation, pre-operative handling, etc. Moreover, indentations 126 may facilitate manipulation (e.g., removal) of medical product(s) 104 from holder 102. For example, a user may use forceps, tweezers, or another suitable medical device to access medical product(s) 104, and the medical device may be passed through indentations 126 to access medical product(s) 104 in cavity 118.

Holder 102 may allow medical product(s) 104 to be removably placed within cavity 118, and holder 102 may also protect and/or retrain medical product(s) 104 within packaging system 100. For example, holder 102 may allow one medical product 104 having a relatively small size, by comparison to the size cavity 118, to be retained within cavity 118 in a desired position and/or configuration. For example, holder 102 may be configured to reduce the degree of available movement of medical product 104 within cavity 118 (e.g., reduce the amount of free space around the sides of medical product 104 to minimize the movement of medical product 104 within cavity 118). For example, thicknesses of sidewalls 102 may control a width of cavity 118, which may help to restrict the lateral movement and/or change in shape of medical product 104 within cavity 118. Because holder 102 may support a relatively small medical product 104 within a relatively larger cavity 118, in some illustrative embodiments, aspects of packaging system 100 may be sized to facilitate manipulation of packaging system 100 by a user, without requiring a high degree of dexterity. Additionally, outer dimensions of holder 102 may approximate the inner dimensions of inner holder 106, for example, to reduce the necessary volume of fluid 110, reduce the movement of holder 102, help to ensure medical product(s) 104 remains submerged in fluid 110, etc. Holder 102 may also facilitate the transfer of medical product(s) 104 from within holder 102 (e.g., in the sterile field) to the treatment site (e.g., to the surgical field) without requiring direct manipulation of medical product(s) 104. For example, a user may manipulate holder 102 to manipulate medical product(s) 104, rather than manipulate the smaller, more delicate medical product(s) 104. Additionally, although not shown, cavity 118 of holder 102 may include one or more stratifications or different depths, for example, to accommodate medical product(s) 104 of different sizes, thicknesses, widths, lengths, etc. The one or more stratifications or different depths may be sized to receive respective medical product(s) 104, which may allow for one holder 102 to be configured to receive different medical product(s) 104. In these aspects, holder 102 may help to constrain the shape of medical product(s) 104 and/or protect medical product(s) 104 from damage during packaging, storage, transportation, pre-operative handling, etc. Holder 102 may also help to ensure medical products(s) 104 are surrounded by fluid 110 regardless of the orientation of packaging system 100.

Figure 3D:
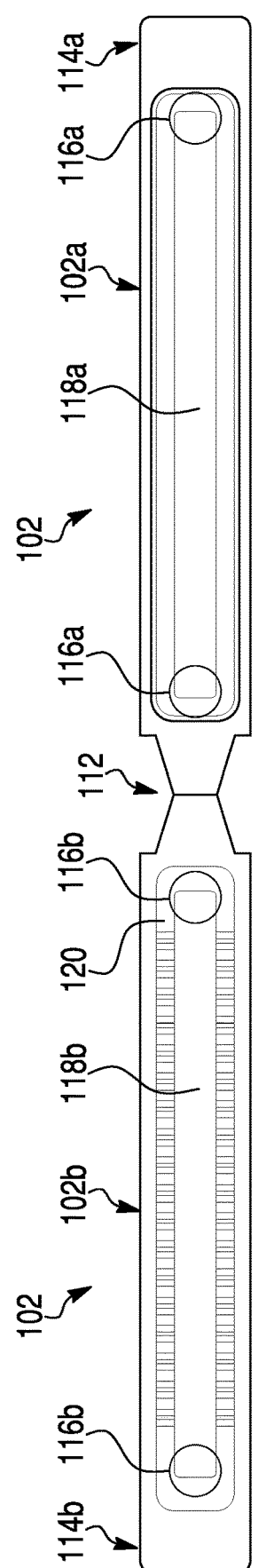
Figure 3E:
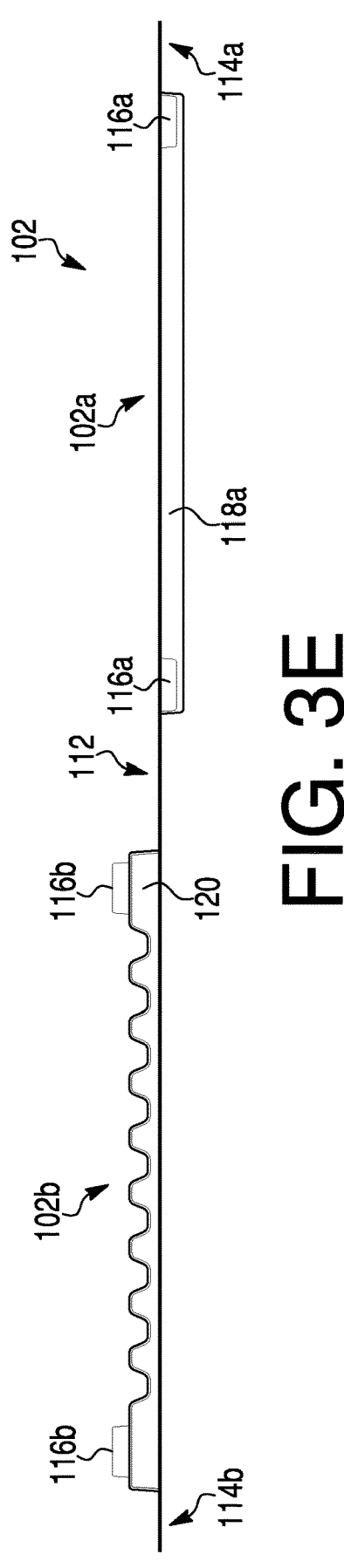

FIG. 3C is a perspective view of holder 102 in uncoupled configuration, for example, in a partially opened configuration. FIG. 3D is a top view of holder 102 in a fully opened position, and FIG. 3E is a side view of holder 102 in the fully opened position. As shown, top portion 102a includes a top cavity 118a, for example, formed by a recessed region within top portion 102a (i.e., recessed in a direction extending away from bottom portion 102b). Bottom portion 102b includes a bottom cavity 118b, for example, formed by sidewalls 120. When top portion 102a and bottom portion 102b are coupled, top cavity 118a and bottom cavity 118b form cavity 118 configured to receive medical product(s) 104 and fluid 110.

Additionally, top portion 102a and bottom portion 102b may include features to form one or more coupling portions 116 (FIG. 1). For example, top portion 102a may include one or more holes, openings, or indents 116a, and bottom portion 102b may include one or more pegs or projections 116b. The one or more holes, openings, or indents 116a and the one or more pegs or projections 116b may be configured to align when holder 102 in a closed configuration so that peg(s) 116b fit within a corresponding hole 116a when top portion 102a is coupled to bottom portion 102b. It is noted that hole(s) 116a may not be through-holes, but rather may be indented portions in top portion 102a that are closed on one end. In one aspect, holder 102 may include two sets of corresponding holes 116a and pegs 116b. For example, a first hole 116a and a first peg 116b may be positioned proximate to joint 112, and a second hole 116a and a second peg 116b may be positioned proximate to coupling end 114, for example, a coupling end 114a on top portion 102a and a coupling end 114b on bottom portion 102b. In this aspect, pegs 116b may be positioned on opposing ends of bottom cavity 118b. Moreover, although hole(s) 116a are shown on top portion 102a and peg(s) 116b are shown on bottom portion 102b, this disclosure is not so limited. For example, one or more holes 116a may be positioned on bottom portion 102b, and one or more pegs 116b may be positioned on top portion 102a. Additionally, in one aspect, top portion 102a may include one hole 116a on a first end and one peg 116b on a second end. Similarly, bottom portion 102b may include one peg 116b on a first end and one hole 116a on a second end, such that, when holder 102 is closed, each hole 116a is aligned with a corresponding peg 116b.

Hole(s) 116a and peg(s) 116b may include corresponding shapes. For example, as shown, hole(s) 116a and peg(s) 116b may include generally cylindrical shapes or circular cross-sectional shapes, but this disclosure is not so limited, as hole(s) 116a and peg(s) 116b may include triangular cross-sectional shapes, square or rectangular cross-sectional shapes, or any other suitable cross-sectional shape. As mentioned above, joint 112 may include a coined hinge, and with hole(s) 116a and peg(s) 116b uncoupled, joint 112 may help to maintain an orientation of holder 102, for example, in one or more open, partially open, full open, etc., configurations between top portion 102a and bottom portion 102b.

As mentioned above, packaging system 100 may be configured to contain and enclose one or more medical products 104, for example, one or more tissue specimens, nerve grafts (e.g., the Avance® Nerve Graft by Axogen), etc., and may retain the one or more medical products 104 in fluid 110. Fluid 110 may be bio-compatible, and may be able to withstand temperatures, for example, between approximately −85 degrees Celsius to approximately 50 degrees Celsius. Moreover, fluid 110 may be configured to preserve medical product 104 at room temperature, for example, between approximately 15 degrees Celsius to approximately 30 degrees Celsius. Furthermore, the various components of packaging system 100 may be bio-compatible, and may be able to withstand temperatures, for example, between approximately −85 degrees Celsius to approximately 50 degrees Celsius. Moreover, the various components of packaging system 100 may be configured to retain medical product 104 and fluid 110 at room temperature, for example, between approximately 15 degrees Celsius to approximately 30 degrees Celsius. It is noted that the temperature(s) that packaging system 110 and fluid 110 are exposed to may vary, for example, depending on the type and/or size of medical product(s) 104, the storage and/or preservation duration, the sterilization processes to be used in conjunction with the packaged medical product(s), and/or one or more other or additional factors. A person having ordinary skill in the art will appreciate the appropriate temperature for the type of tissue or other medical product(s) 104 that is held by packaging system 100.

Packaging system 100 may include sufficient fluid 110 such that medical product 104 is submerged or otherwise surrounded by fluid 110 regardless of the orientation of packaging system 100 relative to gravity. In one aspect, fluid 110 may not entirely fill the cavity formed by inner tray 106, but the cavity may be dimensioned such that any air bubble within the cavity never contacts medical product 104. In some aspects, incorporating an air bubble in inner tray 106 may help to reduce a risk of fluid 110 escaping from inner tray 106 when opening inner tray 106 to access holder 102, to reduce a risk of over-filling inner tray 106, and/or may help to accommodate expansion of fluid 110, for example, if/when frozen during exposure to lower temperatures.

As mentioned, fluid 110 may include one or more liquids that may facilitate the storage and/or preservation of the tissue specimen submerged therein. For example, fluid 110 may facilitate the storage and/or preservation of medical product(s) 104 at room temperature and/or at other colder or hotter temperatures (e.g., about −85 degrees Celsius to about 50 degrees Celsius). According to one example, fluid 110 may include a solution including about 2% to about 15%, e.g., 5%, by volume dimethyl sulfoxide (DMSO). The solution may also have been prepared through addition of about 150 g/L to about 2.5 g/L sodium chloride. The solution may also have been prepared through addition of about 0.3 g/L potassium chloride. The solution may also have been prepared through addition of about 0.2 g/L calcium chloride. The solution may also have been prepared through addition of about 0.4 g/L sodium bicarbonate. The solution may further have been prepared through addition of about 0.1 g/L magnesium chloride. It will be appreciated that various other liquids, including but not limited to, solutions comprising mixtures of monovalent and/or divalent metal cations (e.g., sodium, potassium, magnesium, calcium, etc.) may be utilized in connection with embodiments consistent with the present disclosure, including the preservation solutions disclosed in U.S. patent application Ser. No. 16/898,224, entitled "Wet Preservation of Tissue" and U.S. patent application Ser. No. 16/939,889, also entitled "Wet Preservation of Tissue," both of which are incorporated by reference herein in their entireties.

As discussed above, the shape of holder 102 may help to contain medical product(s) 104 in a given orientation (e.g., in a straight or linear configuration) for stability over time and during sterilization (e.g., during irradiation, as discussed further below). Holder 102 may have a small footprint relative to packaging system 100 to allow for one or more liquid tight containers (e.g., inner tray 106) to be placed around holder 102, while maintaining a relatively low volume of fluid 110 to be present to keep medical product(s) 104 submerged and/or covered in fluid 110. Further, a smaller size of holder 102 and inner tray 106 and less fluid 110 may reduce production costs. As mentioned previously, holder 102 includes channels 122 to allow fluid 110 to interact with medical product(s) 104 when contained within holder 102 and allow for fluid 110 to flow from holder 102 efficiently upon removal of holder 102 from inner tray 106 when medical product(s) 104 is being prepared for use, for example, in a medical procedure. Moreover, inner tray 106 and outer tray 108 may help to catch or retain fluid 110 as holder 102 is removed from inner tray 106. For example, fluid 110 may flow from holder 102 via channels 122, and may be retained within inner tray 106, or within outer tray 108 if inner tray 106 is positioned within outer tray 108.

One or more components of packaging system 100 may be formed of a plastic material, for example, one or more of polypropylene, high density polyethylene, polymethylpentene, polyethylene terephthalate glycol-modified, fluorinated ethylene propylene, etc. In some aspects, the plastic material may be formed of one or more copolyesters, polymers, or other combinations of the aforementioned plastic materials. The plastic material selected may be compatible with one or more sterilization techniques, for example, gamma sterilization, irradiation, or other suitable sterilization techniques, such that packaging system 100 and any contents (e.g., medical product(s) 104, fluid 110, etc.) may be sterilized before, during, or after assembly of packaging system 100. For example, packaging system 100, medical product(s) 104, and fluid 110 may be frozen (e.g., approximately −85° C.) and exposed to cold-chain gamma irradiation.

In some aspects, one or more components of packaging system 100 may be formed of a material that is impermeable to or impedes the flow of oxygen therethrough to prevent or reduce the amount of oxygen that migrates into the interior of packaging system 100 (e.g., into cavity 118), forming an oxygen barrier. Additionally, inner tray 106 and outer tray 108 may form a two-level barrier for any potential contaminants reaching medical product(s) 104 and fluid 110. For example, inner tray 106 may form a first barrier for any potential contaminants reaching medical product(s) 104 and fluid 110, and outer tray 108, when covered with the sealing material, may form a second barrier for any potential contaminants reaching medical product(s) 104 and fluid 110. In some embodiments, one or more components of packaging system 100 may be formed from a multi-layer plastic material.

One or more components of packaging system 100 may be thermoformed, for example, formed by heating a plastic sheet to a pliable forming temperature, molding the heated sheet to the desired shape, and/or trimming the molded sheet to form the desired shape of the component. Alternatively, one or more components of packaging system 100 may be formed by injection molding. Furthermore, it is noted that one or more components of packaging system 100 may be formed of a different material or via a different formation process than one or more other components of packaging system 100. Additionally, the material(s) selected for various components of packaging system 100 may depend on the type of fluid 110 being used, and the type of fluid 110 used may depend on the type of medical product 104 being stored in packaging system 100. Furthermore, the material(s) selected for various components of packaging system 100 may be at least partially transparent, for example, to allow for visualization of medical product(s) 102.

Figure 4:
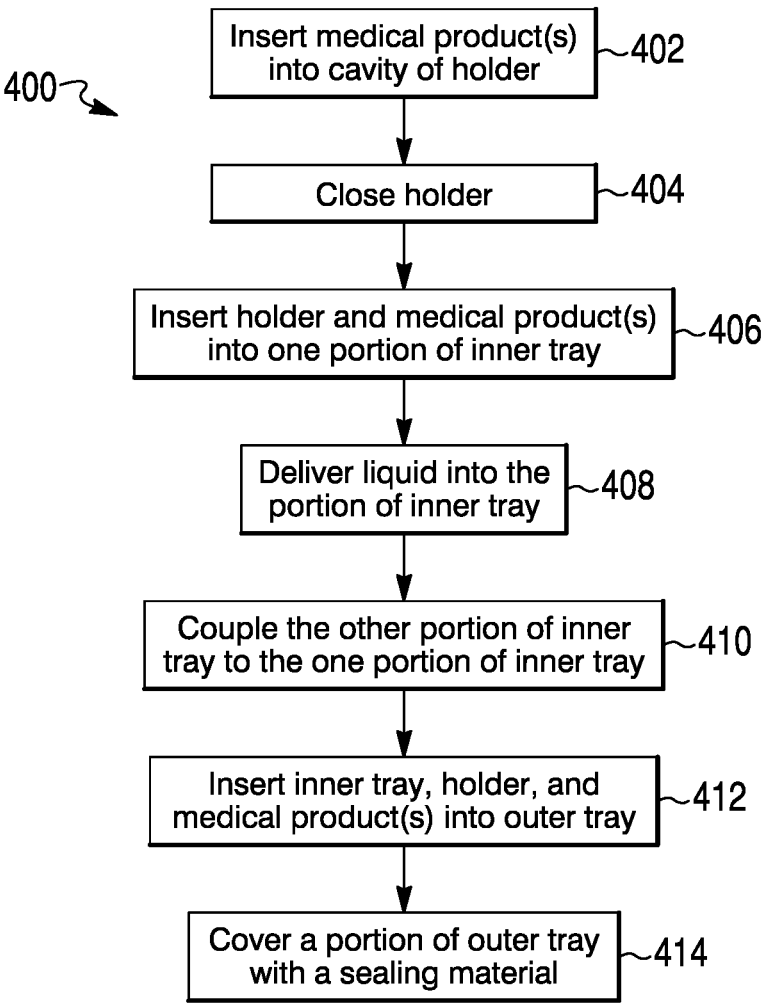
FIG. 4 provides a flow chart depicting an exemplary method for assembling the packaging system, according to aspects of the present disclosure.

FIG. 4 is a flowchart of a method 400 for enclosing medical product 104 within packaging system 100. First, method 400 includes a step 402, in which one or more medical product(s) is inserted into channel 118 of holder 102. Then, method 400 includes a step 404 that includes closing holder 102. As mentioned above, closing holder 102 may include bending holder 102 at joint 112 and bringing coupling end 114*a* of top portion 102*a* and toward coupling end 114*b* of bottom portion 102*b*. Alternatively, as mentioned above, top portion 102*a* and bottom portion 102*b* may be separate from one another (i.e., holder 102 may not include joint 112), and holder 102 may be closed by securing top portion 102*a* to bottom portion 102*b*.

Next, method 400 includes a step 406 that includes inserting holder 102 and medical product(s) 104 into one portion of inner tray 106. As mentioned above, holder 102 and medical product(s) 104 may be inserted into pocket 130*a* of first portion 106*a* or into pocket 130*b* of second portion 106*b*. Then, method 400 includes a step 408 that includes delivering fluid 110 into the portion of inner tray 106. Fluid 110 may surround medical product(s) 104, for example, by flowing through one or more channels 122 into cavity 118. Next, method 400 includes a step 410 that includes coupling the other portion of inner tray 106 to the one portion of inner tray 106. As mentioned above, step 410 may include aligning and coupling interlocking portions 132*a* and 132*b* and inner tray coupling portions 134*a* and 134*b*.

Then, method 400 includes a step 412, in which inner tray 106, holder 102, and medical product(s) 104 are inserted into outer tray 108. For example, a person assembling packaging system 100 may manually place inner tray 106, holder 102, and medical product(s) 104 into outer tray 108.

Alternatively, a machine (e.g., robot) may be programmed or otherwise configured to perform one or more portions of method 400, for example, inserting inner tray 106 and holder 102, and medical product(s) 102 into outer tray 108. Next, method 400 includes a step 414 that includes covering at least a portion of outer tray 108 with one or more sealing materials. In some aspects, step 412 may be optional. For example, in some aspects, packaging system 100 may include holder 102 and inner tray 106, and not outer tray 108. Accordingly, in these aspects, step 414 may be modified to include covering at least a portion of inner tray 106 with one or more sealing materials. Additionally, although method 400 and the steps included therein are discussed as relating to packaging system 100, with inner tray 106 and outer tray 108, method 400, or a portion of the steps of method 400, may be applicable to other containers discussed herein (e.g., aspects of packaging system 500, aspects of packaging system, including vial 660, etc.). Furthermore, it is noted that method 400 may also include an optional step of sterilizing packaging system 100, for example, by exposing packaging system 100 to temperatures of about −85 degrees Celsius for cold-chain gamma irradiation.

In one aspect, step 408 may include delivering approximately 10 mL to approximately 100 mL of fluid 110 to inner tray 106. The amount of fluid 110 delivered to inner tray 106 may depend one or more of on the size of holder 102, medical product(s) 104, or inner tray 106. In some aspects, if one or more of holder 102, medical product(s) 104, or inner tray 106 is smaller, a lower volume of fluid 110 may be delivered to inner tray 106. Similarly, if one or more of holder 102, medical product(s) 104, or inner tray 106 is larger, then a higher volume of fluid 110 may be delivered to inner tray 106. For example, in some aspects, step 408 may include delivering approximately 45 mL to approximately 65 mL of fluid 110 to inner tray 106.

In some aspects, one or both of inner tray 106 and outer tray 108 may help to retain fluid 110 during opening of packaging system 100, which may reduce the amount of fluid 110 that may leak in a sterile field for a medical procedure, may allow for easier clean-up and/or disposal, etc. Furthermore, when holder 102 and medical product 104 are removed from inner tray 106, channels 122 may allow for fluid 110 to drain out of holder 102 and into inner tray 106, without otherwise disturbing (e.g., without moving, bending, etc.) medical product 104.

Various aspects of the present disclosure may help to contain fluid 110, and fluid 110 may help to preserve one or more medical products 104 over the shelf life of the medical product. Packaging system 100 may also help to ensure that fluid 110 is always covering the medical product, such that the medical product is not exposed to air, which may damage the medical product. For example, holder 102 may help to maintain the medical product in substantially the same location within packaging system 100. Packaging system 100 may help to allow for medical product(s) 104 to be positioned in any orientation, for example, during the storage, transportation, pre-operative handling, etc., while still maintaining a seal to prevent liquid loss. Holder 102 may help to maintain the mechanical properties of medical product(s) 104 throughout the shelf life of medical product(s) 104, for example, by keeping medical product(s) 104 submerged or otherwise covered by fluid 110. Holder 102 may facilitate removal of medical product(s) 104, for example, by retaining medical product(s) 104 in a specific configuration and/or providing access to medical product(s) 104 via channels 122. For example, medical product(s) 104 may be retained in a linear configuration, and may be sterilized, for example, via gamma irradiation.

Moreover, holder 102, along with inner tray 106 and outer tray 108, may help maintain a sterile environment within packaging system 100. Furthermore, the design of holder 102 may allow a user (e.g., physician, etc.) to remove holder 102 from the remainder of packaging system 100, while also draining fluid 110 from around medical product(s) 104 (e.g., through channels 122) when the user is preparing the medical product for use, for example, in an operating room setting. For example, fluid 110 and/or a rinsing solution may drain from holder 102, and may then be retained within inner tray 106 and/or outer tray 108. Moreover, one or more of inner tray 106 and outer tray 108 may each be designed to create a radial force when closed (e.g., in a direction outward from holder 102) to promote containment of fluid 110 within. Packaging system 100 may help to ensure that medical product(s) 104 is covered in fluid 110, while also decreasing the necessary amount of fluid 110 to submerge or otherwise covered medical product(s) 104, which may reduce the overall cost and/or difficulty in assembling packaging system 100, as fluid 110 may be expensive, difficult to obtain, difficult to produce, etc.

Figure 5A:
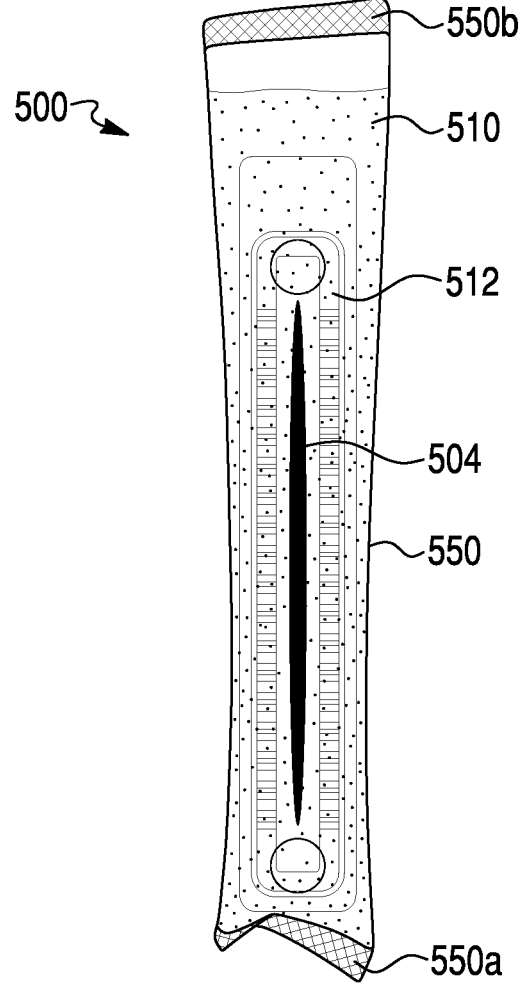
FIG. 5A illustrates another exemplary packaging system in a partially assembled configuration.
Figure 5B:
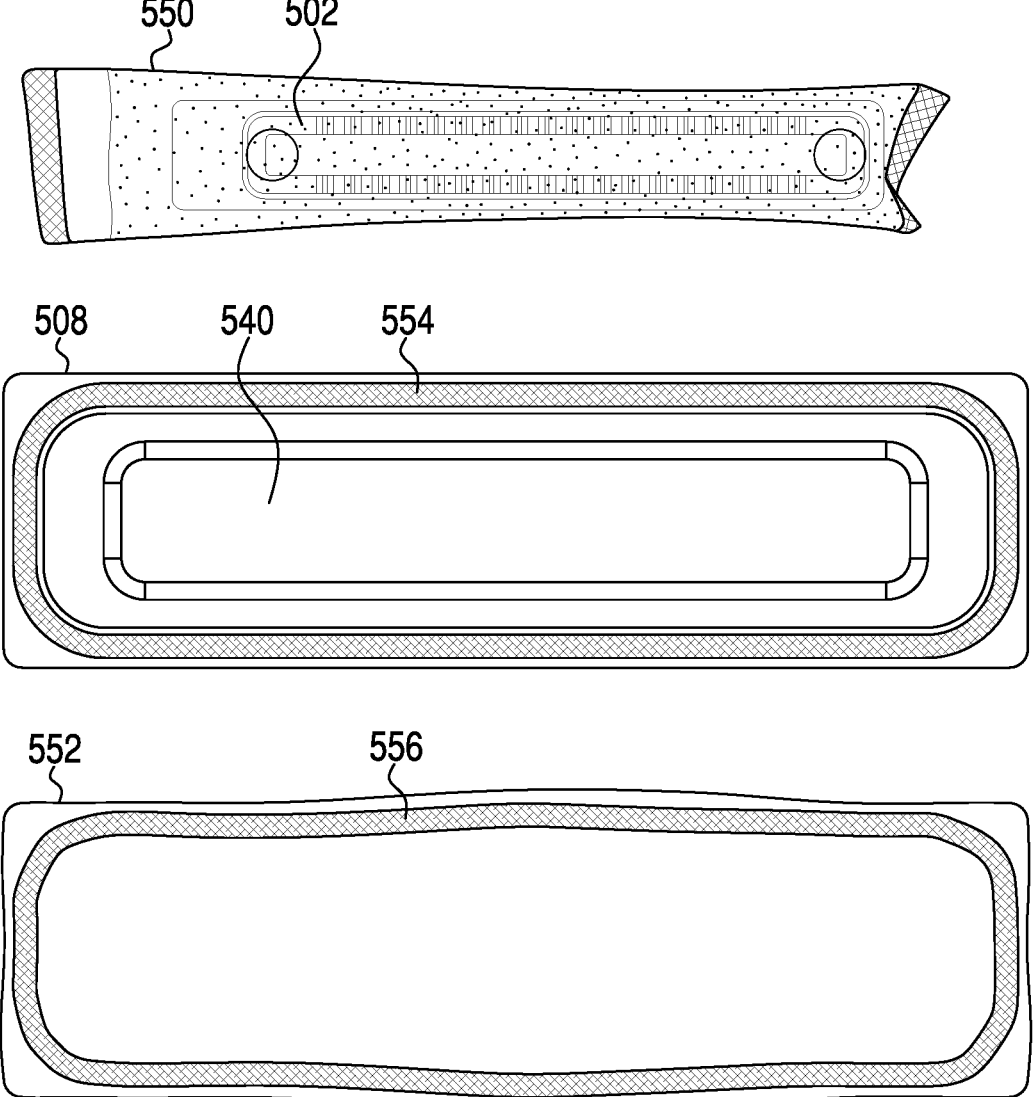
FIG. 5B illustrates the packaging system of FIG. 5A in an unassembled configuration, according to aspects of the present disclosure.

FIGS. 5A and 5B illustrate an alternative example, according to the present disclosure, with similar elements to packaging system 100. FIG. 5A illustrates a portion of packaging system 500 in a partially assembled configuration, and FIG. 5B illustrates packaging system 500 in an unassembled configuration. Packaging system 500 includes a holder 502 configured to hold one or more medical products 504. Packaging system 500 also includes an inner container, for example, a pouch 550, and an outer container, for example, a tray 508. Holder 502 may be similar to holder 102, as discussed above, and tray 508 may be similar to outer tray 108, as discussed above. Additionally, as shown in FIG. 5B, packaging system 500 may include a cover 552.

As shown in FIG. 5A, holder 502 may be positioned within pouch 550, and during packaging, fluid 510 may be delivered to pouch 550 to surround holder 502 and medical product(s) 504. Pouch 550 may include a first end 550a and a second end 550b. For example, first end 550a may be sealed, and second end 550b may initially be open during packaging, or vice versa, or both ends may be open. Holder 502 and fluid 510 may be inserted within pouch 550 through the open end during packaging. The amount of fluid 510 delivered to pouch 550 may be sufficient to substantially surround holder 502 within pouch 550. Approximately 10 mL to approximately 100 mL of fluid 510, for example, approximately 45 mL to approximately 65 mL of fluid 510, may be delivered to pouch 550 to cover holder 502. Then, the open end, in this case second end 550b, may be sealed to enclose holder 502 and fluid 510. If both ends are initially open, one of the open ends may be sealed before delivery of fluid 510 to pouch 550, and the other end may be sealed after fluid 510 has been delivered to pouch 550. In this manner, pouch 550 may function similarly to inner tray 106 and contain fluid 510 around holder 502. Pouch 550 may be formed of a suitable plastic material, for example, any of the materials discussed above. One end of pouch 550 may be pre-sealed, and another end of pouch 550 may be sealed after holder 502 and fluid 510 have been delivered to pouch 550. Additionally, as mentioned above, fluid 510 may not completely fill pouch 550, such that there is a small air bubble within sealed pouch 550, which may help to reduce a risk of fluid 510 escaping from pouch 550 when opening pouch 550 to access holder 502, may help to reduce the risk of overfilling pouch 550, and/or may help to accommodate expansion of fluid 510, for example, when frozen if/when exposed to lower temperatures.

As shown in FIG. 5B, pouch 550, with holder 502 and medical product(s) 504 contained within pouch 550, may be positioned within tray 508, for example, within a well 540. Then, as discussed above, tray 508 may be sealed. For example, tray 508 may include a tray sealing portion 554, which may include a sealing material (e.g., an adhesive) or may be configured to bind to a sealing material. Cover 552 may also include a sealing portion 556, which may include a sealing material (e.g., an adhesive) or may be configured to bind to a sealing material. In this aspect, cover 552 may be positioned over tray 508 such that sealing portion 554 and sealing portion 556 are aligned with tray 508 is within cover 552. Although not shown, tray 508 and cover 552 may include one or more features discussed above, for example, coupling portions 134a and 134b, notched portion 142, etc.

One or both of sealing portion 554 and sealing portion 556 may include a sealing material. For example, in one aspect, cover 552 may include an adhesive on sealing portion 556. The adhesive may be applied by the user, may be uncovered by removing a removable film, or may otherwise be coupled to and/or uncovered on cover 552. Additionally or alternatively, an additional mechanism may be used to help couple cover 552 and tray 508 and form a seal between cover 552 and tray 508. When cover 554 is positioned over tray 508, tray 508 and cover 554 may seal pouch 550, holder 502, medical product(s) 504, and liquid 510 within tray 508.

Figure 6A:
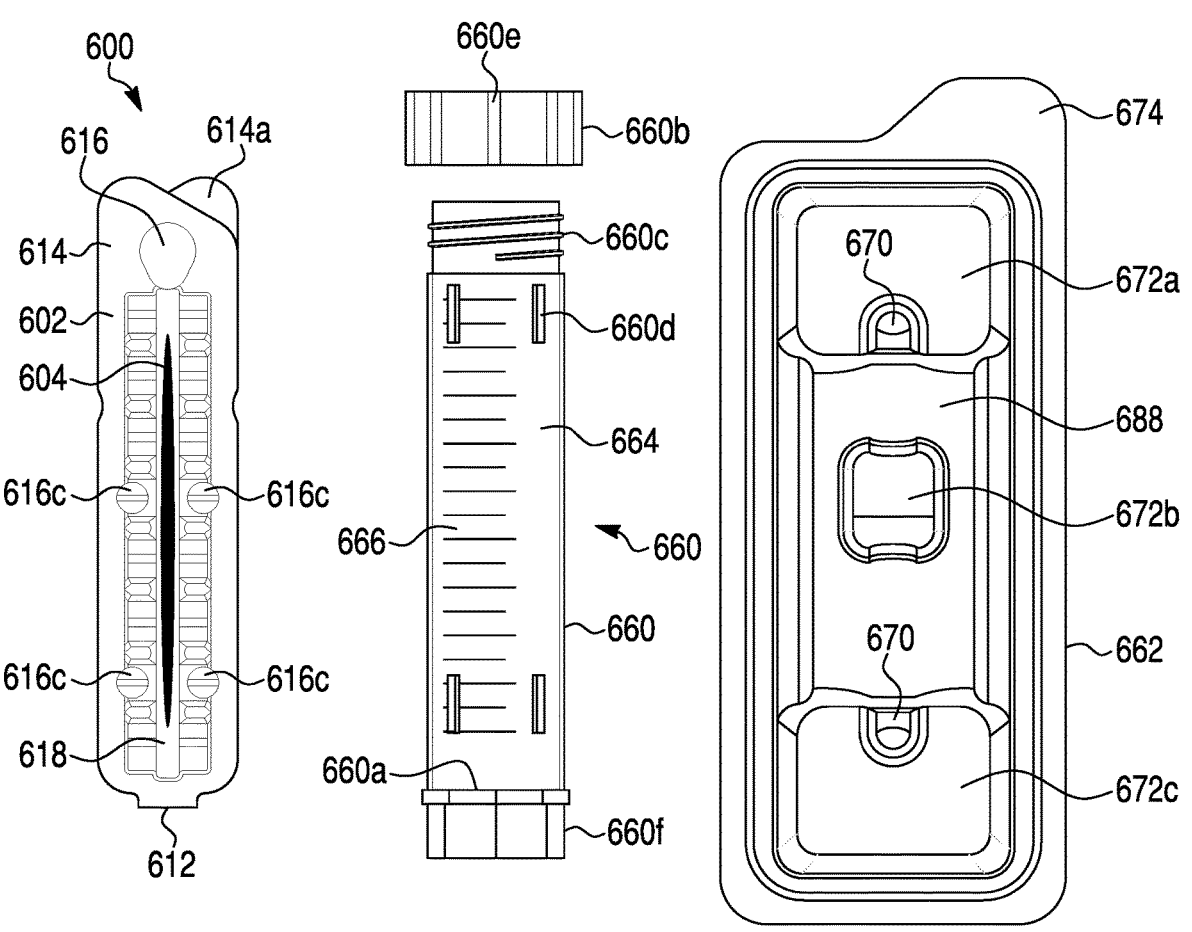
FIG. 6A illustrates yet another exemplary packaging system in a partially assembled configuration.
Figure 6B:
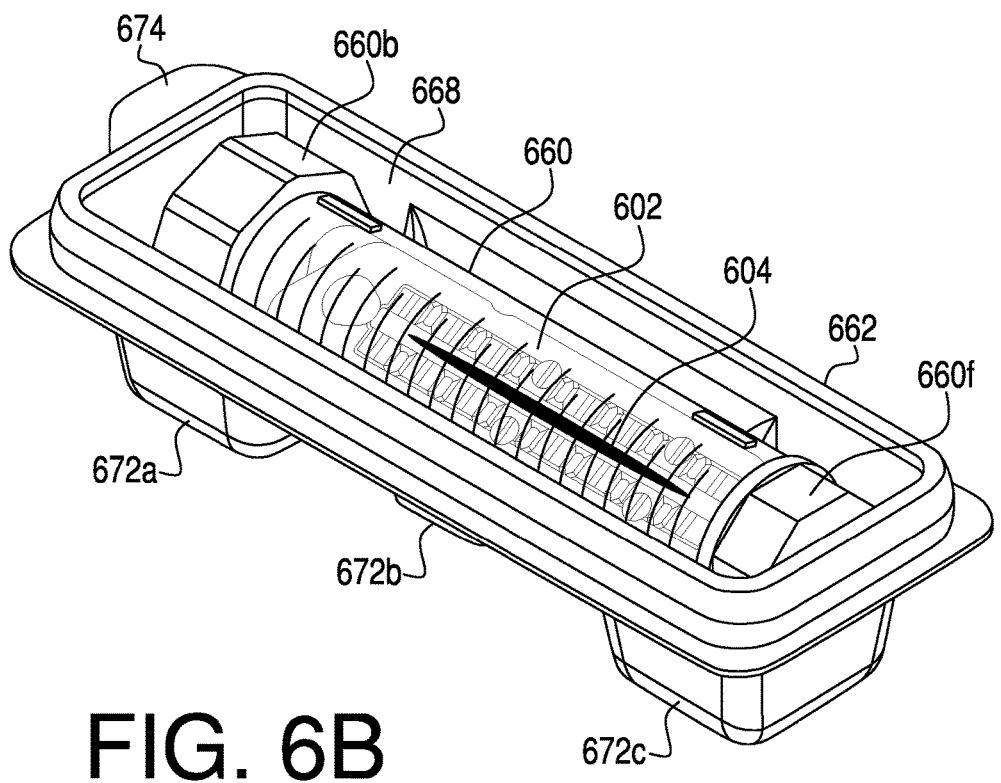
FIG. 6B illustrates the packaging system of FIG. 6A in an unassembled configuration, according to aspects of the present disclosure.
Figure 6C:
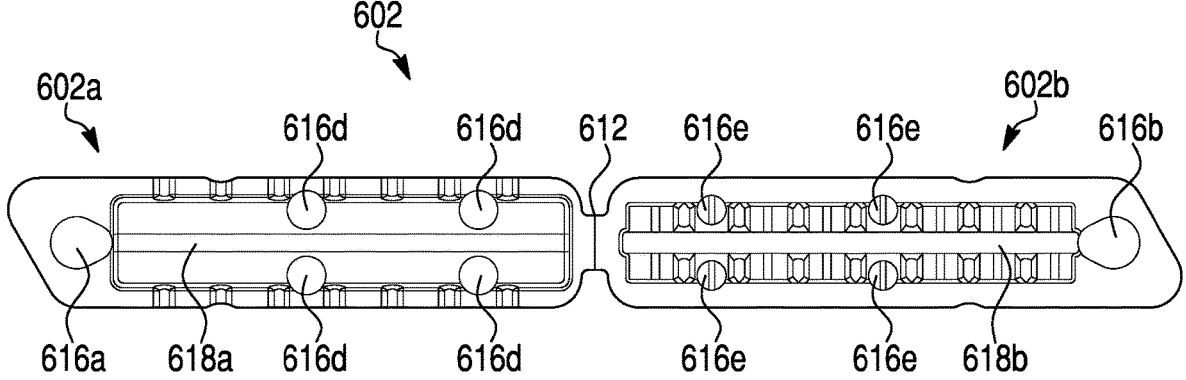
FIG. 6C illustrates a portion of the packaging system of FIG. 6A in an open configuration, according to aspects of the present disclosure.

FIGS. 6A-6C illustrate another alternative example, according to the present disclosure, with similar elements to packaging system 100. FIG. 6A illustrates components of a packaging system 600 in an unassembled configuration, and FIG. 6B illustrates packaging system 600 in a partially assembled configuration. Packaging system 600 includes a holder 602 configured to hold one or more medical products 604. FIG. 6A illustrates holder 602 in a closed configuration, and FIG. 6C illustrates holder 602 in an open configuration. Packaging system 600 also includes an inner container, for example, a vial 660, configured to hold holder 602. Packaging system 600 may further include an outer container, for example, a shell 662, configured to hold vial 660. However, it is noted that, in some aspects, packaging system 600 includes holder 602 and vial 660, but does not include shell 662.

Similar to holders 102 and 502, holder 602 may be formed by a top portion 602a and a bottom portion 602b to form a cavity 618 configured to receive and enclose medical product(s) 604. For example, as shown in FIG. 6C, top portion 602a may include a top cavity 618a, and bottom portion 602b may include a bottom cavity 618b to form cavity 618. The width, length, and depth of cavity 618 may vary depending on the size, shape, or other details of medical product(s) 604. One or more of top portion 602a and bottom portion 602b may include side walls with one or more channels, as discussed above. The top and bottom portions 602a and 602b may be separate portions, or may be coupled at a joint 612, which may include a taper or narrowed width or thickness in some embodiments. For example, joint 612 may include a coined hinge, as discussed above. Holder 602 may also include one or more coupling portions 616, as discussed above, for example, with each coupling portion 616 including one or more holes, openings, or indents 616a, for example, in top portion 602a and one or more pegs or projections 616b, for example, in bottom portion 602b, as shown in FIG. 6C. Additionally, as shown in FIG. 6A, holder 602 may include one or more central coupling portions 616c, for example, four coupling portions 616c, formed by projection and recess (e.g., peg/hole) arrangements, which form a friction fit, a press fit, a snap fit, etc. in order to form a releasable securing mechanism, as discussed in detail above with respect to FIGS. 3A-3E. For example, the central coupling portions 616c may be formed by one or more holes, openings, or indents 616d, for example, in top portion 602a and one or more pegs or projections 616e, for example, in bottom portion 602b, as shown in FIG. 6C.

Moreover, as shown in FIG. 6A, holder 602 may include an access tab 614a at a coupling end 614. For example, one of the top and bottom portions (FIGS. 3A-3E and 6C) may include a wider portion than the other of the top and bottom portions to form access tab 614a, which may help the user manipulate holder 602 (e.g., open holder 602 by separating the top and bottom portions). In another aspect, although not shown, coupling end 614 of the top portion may extend farther in a first direction, e.g., a lateral direction, than coupling end 614 of the bottom portion, or vice versa. This relatively farther extension of the top or bottom portion of coupling end 614 may form a first access tab 614a, and coupling end 614 of the bottom portion may extend farther in a second lateral direction than coupling end 614 of the top portion to form a second access tab 614a. Additionally, although not shown, aspects of holder 602 (e.g., access tab 614a) may be included in holder 102, holder 502, and/or other components of packaging systems 100, 500, 600.

Vial 660 includes a vial cavity 664. For example, once medical product(s) 604 has been positioned within holder 602, holder 602 and medical product(s) 604 may be inserted into vial cavity 664 of vial 660. As shown in FIG. 6A, a bottom portion of vial cavity 664 may include a tapered or narrowed portion 660a, for example, configured to receive a portion of joint 612 of holder 602, which may help retain and/or fix holder 602 within vial cavity 664. Moreover, vial 660 includes a cap 660b, which may be removed for delivery of holder 602 and medical product(s) 604. Cap 660b may be a screw-cap, stopper, or other device configured to selectively seal vial 660. For example, vial 660 may include a threading 660c, and cap 660b may include a corresponding inner threading (not shown). Vial 660 and cap 660b may form a liquid-tight container for a liquid (e.g., fluid 110) to help prevent loss of the fluid through leaks, evaporation, etc. Vial 660, with holder 602 within vial 660, may help to ensure that medical product(s) 604 are submerged in a preservation solution (e.g., fluid 110) regardless of the orientation of packaging system 600. The inner dimensions of vial 660 may approximate the outer dimensions of holder 602, for example, to reduce the necessary volume of fluid, reduce the movement of holder 602, help to ensure medical product(s) 604 remains submerged in fluid, etc. In this aspect, vial 660 may include a non-circular cross-section (either outer circumference or inner circumference) to reduce the amount of fluid necessary to fill vial 660 and submerge medical product(s) 604. Vial 660 may also include one or more indications 666, for example, to indicate a volume of liquid (e.g., fluid 110) within vial 660. In this manner, vial 660 may function similarly to inner tray 106 and pouch 550 and contain fluid around holder 602. For example, as mentioned above, the fluid may not completely fill vial 660, such that there is a small air bubble within sealed vial 660, which may help to reduce a risk of the fluid escaping from vial 660 when opening vial 660 to access holder 602, to reduce the risk of overfilling, and/or may help to accommodate expansion of the fluid, for example, if/when frozen during exposure to lower temperatures.

Furthermore, vial 660 may include one or more retention features 660d, for example, inner projections or fins that project inward into vial cavity 664, which may help to prevent and/or reduce movement (e.g., rotation) of holder 602 within vial 660 and to ensure that medical product(s) 604 is visible, for example, for irradiation or user inspection. Retention features 660d may be molded or otherwise formed during the formation of vial 660, added after the formation of vial 660, etc. In one aspect, retention features 660d may include one or more retention features 660d at a top portion of vial 660 and one or more retention features 660d at a bottom portion of vial 660. In this aspect, retention feature(s) 660d at the top portion of vial 660 may be spaced away from threading 660c by, for example, about 1-3 mm, or about 2 mm, which may help allow for vial 660 to be formed via molding. The opening of vial 660 may be wide enough to receive holder 602 and to allow for removal of holder 602 with the user's finger, forceps, etc. Moreover, cap 660b and/or one or more portions of vial 660 may include one or more surface features (e.g., bumps, grooves, etc.) and/or one or more shapes (e.g., octagonal flats), which may help to inhibit vial 660 from rolling in case vial 660 tips over and/or is oriented horizontally on a surface. For example, cap 660b may include one or more projections or bumps 660e, which may help to prevent vial 660 from rolling when placed horizontally on a surface and/or to help the user grip cap 660b, for example, when opening vial 660 to access holder 602. Alternatively or additionally, one or more portions of vial 660, for example, a bottom portion, may include flat surfaces 660f. For example, the bottom portion of vial 660 may include an octagonal bottom with eight flat surfaces 660f, which may help to prevent vial 660 from rolling when placed horizontally on a surface and/or help the user grip vial 660, for example, when removing cap 660b. In one aspect, vial 660 may include an induction seal, for example, underneath cap 660b, which may help to provide an additional sterile barrier. Additionally or alternatively, vial 660 may include a non-circular inner cross-section, which may reduce the amount of fluid (e.g., fluid 110) required to fill vial 660, while still accommodating holder 602, and/or help to retain holder 602 in a certain configuration within vial 660.

Shell 662 includes a shell well 688, which may be configured to receive vial 660. Shell 662 may help to prevent damage to vial 660, cap 660b, holder 602, and medical product(s) 604 during storage, transportation, pre-operative handling, etc. Shell well 688 may include one or more slots 670 configured to receive vial 660. Shell well 688 may also be used as a basin to receive holder 602 and medical product(s) 604 during a rinsing step. For example, in preparation for using medical product(s) 604 (e.g., for implantation), holder 602 and medical product(s) 604 may be removed from vial 660, and may be positioned within shell well 688 and rinsed with a rinsing solution. Shell well 688 may help to retain the rinsing solution and/or any liquids, solids (e.g., debris), etc. that are rinsed off medical product(s) 604. Furthermore, although not shown, shell well 688 may include one or more fill lines or other suitable indicia, for example, to help the user rinse medical product(s) 604. It is noted that the sizes of one or more of holder 602, vial 660, or shell 662 may be any appropriate size and/or thickness. For example, as discussed above, the size and/or shape of holder 602 may or may not correspond to the size and/or shape of medical product(s) 604. Additionally, the size and/or shape of vial 660 may or may not correspond to the size and/or shape of holder 602, and the size and/or shape of shell 662 may or may not correspond to the size and/or shape of vial 660.

Additionally, shell well 688 may include one or more projecting portions 672a, 672b, 672c, which may be connected by relatively narrower or shallower slots 670. Projecting portions 672a, 672b, 672c and slots 670 may help to secure vial 660 within shell 662. Projecting portions 672a, 672b, 672c may also help to lessen impacts on vial 660 within shell 662, for example, by providing open portions of shell well 688 between the exterior of shell 662 and vial 660. In one aspect, projecting portions 672a, 672b, 672c may be positioned at the end portions and a central portion of shell well 688. Shell 662 may further include one or more notched portions or tabs 674 (e.g., similar to notched portions 142), which may help a user grip shell 662 or otherwise manipulate (e.g., open) shell 662. Notched portion(s) 674 or tabs may extend away at an angle (e.g., between approximately 180 and 0 degrees, between approximately 135 degrees, approximately 90 degrees, approximately 45 degrees, approximately 30 degrees, approximately 15 degrees, etc.) from the remainder of shell 662. Moreover, in some aspects, notched portion(s) 674 or tabs may extend away at an angle greater than 180 degrees from the remainder of shell 662 before or after being manipulated by a user, for example, when opening shell 662. Additionally, although not shown, a cover or sealing material may be included around a periphery of shell well 688 to seal shell well 688. The cover or sealing material may not be coupled to notched portion(s) or tabs 674, which may help the user to separate the cover or sealing material from shell 662 when opening packaging system 600. For example, a foil-polyurethane cover may be positioned over shell well 688. Alternatively or additionally, a cover, seal, or pouch may be positioned around the entirety of shell 662. In these aspects, the cover may help to form a sterile barrier around or within shell 662, which may help to facilitate the safe storage, transportation, pre-operative handling, etc. of packaging system 600, e.g., similarly to cover 552 in FIG. 5B. Furthermore, although not shown, shell 662 may include one or more coupling portions 134a and 134b, as discussed with respect to FIGS. 1 and 2, or sealing portions 554 and 556, as discussed with respect to FIGS. 5A and 5B, for example, to help couple the covering to shell 662. In one example, shell 662 may include a snap-on lid to enclose vial 660 within shell 662. In another example, shell 662 may be sealed to enclose vial 660, holder 602, and medical product(s) 604, and then packaging system 600 may be placed within a pouch and sealed. In yet another example, shell 662 may be replaced by a pouch or other outer container to help form a sterile barrier around vial 660.

Although not shown, one or more components of packaging systems 100, 500, and 600 may include a space for or may include one or more markings, for example, printed, debossed, embossed, imprinted, or otherwise formed on the component. For example, the one or more markings may identify one or more medical product(s) 104, 504, and 604 or otherwise provide information (e.g., packaging data, expiration date, compatibility factors, storage instructions, etc.) to the user.

Similar to packaging system 100, packaging systems 500 and 600 may help to retain one or more medical products in a certain orientation and may help to ensure that the one or more medical products are submerged or otherwise covered in a fluid, for example, to help preserve the one or more medical products during packaging, storage, transportation, pre-operative handling, etc. Moreover, packaging systems 500 and 600 may help to seal the one or more medical products and fluid within a sterile field. Packaging systems 500 and 600 may help to retain the fluid during the opening packaging systems 500 and 600, and may also help to retain the fluid during usage of the one or more medical products in a medical procedure.

Various aspects discussed herein, for example, packaging systems 100, 500, and 600, may facilitate retention of one or more medical products in a desired orientation (e.g., linear). For example, it depending on the medical product contained, it may be desirable to prevent the medical product from bending back on itself, from balling up, from curling, from becoming misshaped, etc. Additionally, various aspects discussed herein, for example, packaging systems 100, 500, and 600, may promote retention of a fluid (e.g., fluid 110) within the packaging system, even when exposed to varying temperatures. Moreover, various aspects discussed herein, for example, packaging systems 100, 500, and 600, may facilitate retention of the fluid such that the fluid surrounds the one or more medical products, regardless of the orientation of the packaging system. Various aspects discussed herein, for example, packaging systems 100, 500, and 600 (and the fluid retained within) may be designed to withstand varying temperatures and temperature shifts, for example, from room temperature to −85 degrees Celsius and back to room temperature, and/or to colder or warmer temperatures. Additionally, various aspects discussed herein, for example, packaging systems 100, 500, and 600, may be at least partially transparent, for example, to allow for a user to visualize the one or more medical products retained within. Furthermore, various aspects discussed herein, for example, packaging systems 100, 500, and 600, may promote retention of fluid (e.g., fluid 110 or a rinsing solution) when one or more portions of the packaging system are opened and/or when the retained medical products are treated and/or removed.

Other embodiments of the present disclosure will be apparent to those skilled in the art from consideration of the specification and practice of the embodiments disclosed herein. While certain features of the present disclosure are discussed within the context of exemplary systems, devices, and methods, the disclosure is not so limited and includes alternatives and variations of the examples herein according to the general principles disclosed. It is intended that the specification and examples be considered as exemplary only, with a true scope and spirit of the present disclosure being indicated by the following claims.

What is claimed is:

1. A packaging system, comprising:

a holder, including a top portion and a bottom portion that cooperate to form a cavity, wherein the cavity is configured to receive one or more tissue products therein and to retain the one or more tissue products therein, wherein the top portion and the bottom portion are pivotably coupled by a joint at respective ends of the top portion and the bottom portion, wherein opposing ends of the top portion and the bottom portion from the joint are free ends, wherein the free end of one of the top portion or the bottom portion includes a mating projection, and wherein the free end of the other one of the top portion or the bottom portion includes a recess configured to receive the mating projection to releasably secure the top portion and the bottom portion together; and an inner container, wherein the inner container defines an interior region configured to receive the holder therein, wherein the inner container includes a plurality of retention features that project inward into the interior region, and wherein the plurality of retention features are dimensioned to constrain movement of the holder when the holder is received within the interior region of the inner container, wherein the plurality of retention features includes one or more retention features at a top portion of the inner container, and wherein the plurality of retention features includes one or more retention features at a bottom portion of the inner container, wherein the holder includes sidewalls that form the cavity, and wherein the sidewalls include channels configured to fluidly connect the cavity to the interior region of the inner container.

2. The packaging system of claim 1, wherein the inner container includes an inner tray that includes a first portion and a second portion, wherein the first portion and the second portion each include an interlocking portion that forms a seal when coupled together.

3. The packaging system of claim 1, further comprising: an outer container, wherein the outer container includes a well configured to receive the inner container therein.

4. The packaging system of claim 3, wherein at least one of the holder, the inner container, or the outer container is formed of a plastic material and/or via thermoforming.

5. The packaging system of claim 1, wherein the channels are formed by extensions and indentations in the sidewalls.

6. The packaging system of claim 5, wherein the extensions and indentations in the sidewalls are rounded.

7. The packaging system of claim 1, wherein the inner container is a vial including a top end and a bottom end, wherein the top end of the vial includes a threading, and wherein the one or more retention features at the top portion of the vial are spaced away from the threading at the top end of the vial.

8. The packaging system of claim 7, wherein the vial includes one or more of bumps, grooves, or flat surfaces on an outer surface of the vial configured to inhibit rolling of the vial when placed on a surface.

9. The packaging system of claim 1, further comprising a fluid configured to preserve one or more tissue products within the cavity of the holder.

10. The packaging system of claim 9, wherein the fluid includes a solution including about 2% to about 15% by volume dimethyl sulfoxide (DMSO), and one or more monovalent and/or divalent metal cations.

* * * * *